(12) United States Patent
Viraraghavan et al.

(10) Patent No.: US 11,372,547 B2
(45) Date of Patent: Jun. 28, 2022

(54) COMPRESSION OF AGING DATA DURING COMPACTION

(71) Applicant: INTERNATIONAL BUSINESS MACHINES CORPORATION, Armonk, NY (US)

(72) Inventors: Praveen Viraraghavan, Chicago, IL (US); Ethan Wozniak, Park Ridge, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 118 days.

(21) Appl. No.: 16/790,134

(22) Filed: Feb. 13, 2020

(65) Prior Publication Data

US 2021/0255777 A1 Aug. 19, 2021

(51) Int. Cl.
*G06F 3/06* (2006.01)
*G06F 12/02* (2006.01)

(52) U.S. Cl.
CPC ............ *G06F 3/0608* (2013.01); *G06F 3/067* (2013.01); *G06F 3/0653* (2013.01); *G06F 3/0659* (2013.01)

(58) Field of Classification Search
CPC .... G06F 3/0608; G06F 3/0653; G06F 3/0659; G06F 3/067; G06F 12/023; G06F 12/0253–0276; G06F 3/061; G06F 3/0614; G06F 3/0617; G06F 3/0646; G06F 3/0647; G06F 3/0683–0688; G06F 12/0238; G06F 12/0246; G06F 12/0261; G06F 12/0269; G06F 12/0276
(Continued)

(56) References Cited

U.S. PATENT DOCUMENTS 8,788,778 B1   7/2014   Boyle
8,862,837 B1   10/2014  Marshak et al.
(Continued)

FOREIGN PATENT DOCUMENTS

WO   2013192020   12/2013
WO   2014105323   7/2014

OTHER PUBLICATIONS

Chen et al., "Heap Compression for Memory-Constrained Java Environments", OOPSLA'03, Oct. 26-30, 2003, 20 pages.
(Continued)

*Primary Examiner* — Ilwoo Park
(74) *Attorney, Agent, or Firm* — Randy E. Tejeda; Andrew D. Wright; Roberts Calderon Safran & Cole, P.C.

(57) ABSTRACT

Methods and systems for compression of aging data during compaction are disclosed. A method includes: ingesting a plurality of data objects into a dispersed storage network (DSN); determining that a compaction threshold is met for a storage medium in the DSN; and compacting the storage medium, the compaction including, for each of the plurality of data objects: determining a number of times the data object has been compacted; in response to the number of times the data object has been compacted exceeding a predetermined threshold, compressing the data object and rewriting the compressed data object to a new area on a storage medium; and in response to the number of times the data object has been compacted not exceeding the predetermined threshold, rewriting the data object to the new area on the storage medium without compressing the data object.

20 Claims, 5 Drawing Sheets

(58) Field of Classification Search
USPC .................. 710/68, 74; 711/154, 161, 162
See application file for complete search history.

(56) References Cited

U.S. PATENT DOCUMENTS

| | | |
|---|---|---|
| 9,448,738 B2 | 9/2016 | Horn |
| 2009/0327621 A1 | 12/2009 | Kliot et al. |
| 2013/0086131 A1* | 4/2013 | Hunt .................. G06F 12/0276 |
| | | 707/819 |
| 2016/0253105 A1 | 9/2016 | Chang et al. |
| 2018/0088811 A1* | 3/2018 | Kanno .................. G06F 3/0679 |
| 2018/0150422 A1* | 5/2018 | Tipton .................. G06F 3/0635 |
| 2020/0110698 A1* | 4/2020 | Kanno .................. G06F 3/0641 |
| 2021/0117132 A1* | 4/2021 | Vankamamidi ....... G06F 3/0661 |

OTHER PUBLICATIONS

Mell et al., "The NIST Definition of Cloud Computing", NIST, Special Publication 800-145, Sep. 2011, 7 pages.

\* cited by examiner

COMPRESSION OF AGING DATA DURING COMPACTION

BACKGROUND

Aspects of the present invention generally relate to computing devices and, more particularly, to methods and systems for compression of aging data during compaction.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. Computing devices typically include a central processing unit (CPU), a memory system, user input/output interfaces, peripheral device interfaces, and an interconnecting bus structure. A computing device may effectively extend its CPU by using cloud computing to perform one or more computing functions (e.g., a service, an application, an algorithm, an arithmetic logic function, etc.) on behalf of the computing device. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage network (DSN) system. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

SUMMARY

In a first aspect of the invention, there is a method that includes: ingesting, by a computing device, a plurality of data objects into a dispersed storage network (DSN); determining, by the computing device, that a compaction threshold is met for a storage medium in the DSN; and compacting, by the computing device, the storage medium, the compaction including, for each of the plurality of data objects: determining, by the computing device, a number of times the data object has been compacted; in response to the number of times the data object has been compacted exceeding a predetermined threshold, the computing device compressing the data object and rewriting the compressed data object to a new area on a storage medium; and in response to the number of times the data object has been compacted not exceeding the predetermined threshold, the computing device rewriting the data object to the new area on the storage medium without compressing the data object.

In another aspect of the invention, there is a computer program product that includes one or more computer readable storage media, and program instructions collectively stored on the one or more computer readable storage media. The program instructions include: program instructions to ingest a plurality of data objects into a dispersed storage network (DSN); program instructions to, for each of the plurality of ingested data objects, generate a plurality of slices from the data object and store one or more of the plurality of slices in a first storage area in the DSN; program instructions to determine that a compaction threshold is met for the first storage area; and program instructions to perform compaction by, for each of the slices stored in the first storage area: determining a number of times the slice has been compacted; in response to the number of times the slice has been compacted exceeding a predetermined threshold, compressing the slice and rewriting the compressed slice to a second storage area in the DSN; and in response to the number of times the slice has been compacted not exceeding the predetermined threshold, rewriting the slice to a third storage area in the DSN without compressing the data object.

In another aspect of the invention, there is a system that includes: a processor, a computer readable memory, one or more computer readable storage media, and program instructions collectively stored on the one or more computer readable storage media, the program instructions executable to: ingest a plurality of data objects into a dispersed storage network (DSN); determine that a compaction threshold is met for a storage medium in the DSN; and compact the storage medium, the compaction comprising, for each of the plurality of data objects: determining a number of times the data object has been compacted; in response to the number of times the data object has been compacted exceeding a predetermined threshold, compressing the data object and rewriting the compressed data object to a new area on a storage medium; and in response to the number of times the data object has been compacted not exceeding the predetermined threshold, rewriting the data object to the new area on the storage medium without compressing the data object.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
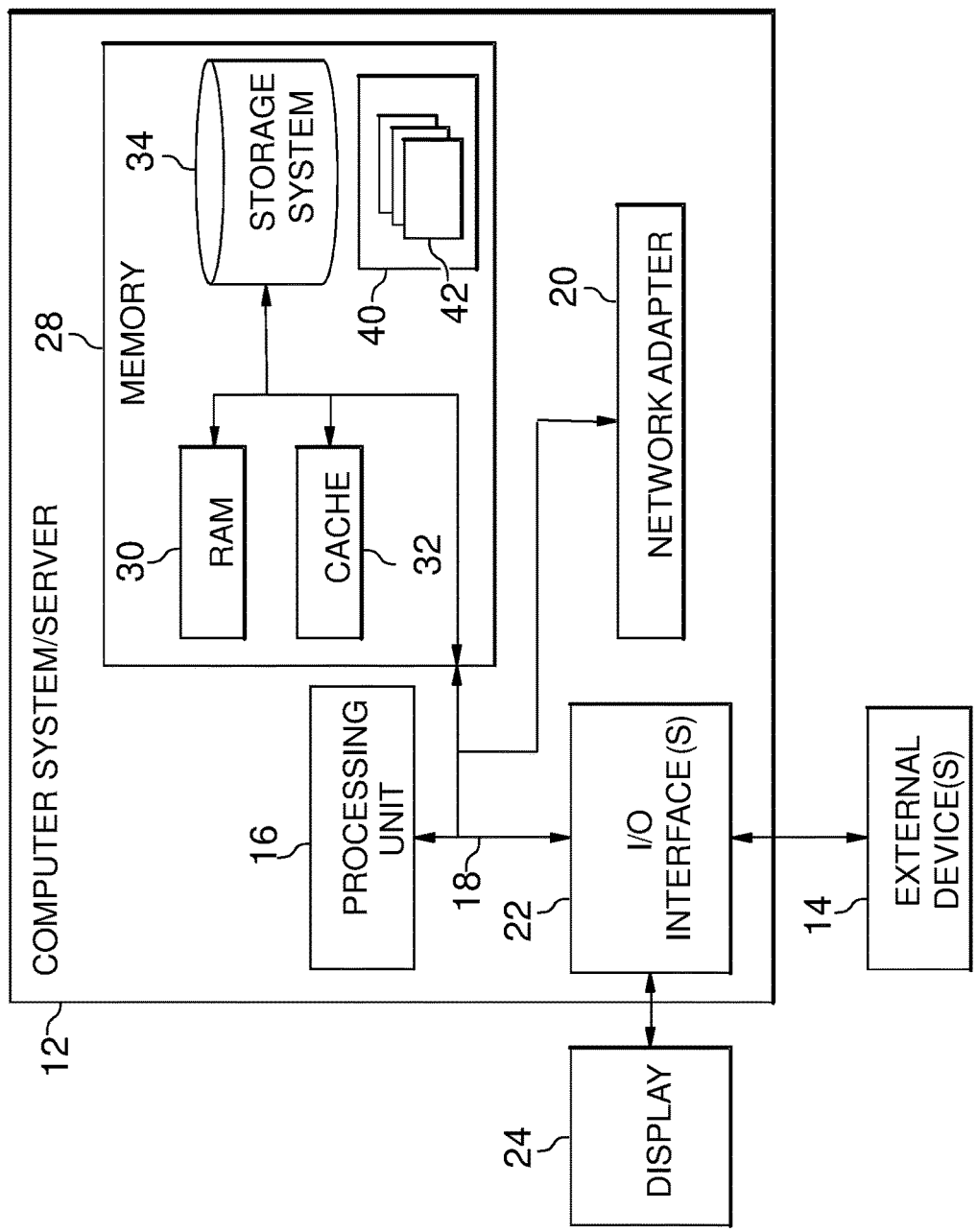
FIG. 1 depicts a cloud computing node according to an embodiment of the present invention.

Aspects of the present invention generally relate to computing devices and, more particularly, to methods and systems for compression of aging data during compaction. As described herein, aspects of the invention include a method and system that compress aging data in a DSN while compacting a storage medium. In particular, aspects of the invention include a method and system that ingest data within a DSN; once the ingested data is at rest within storage media of the DSN, examine the ingested data to identify objects in the ingested data that have survived compaction more than a predetermined number of times as candidates for compression; and compact the ingested data to remove any gaps caused by object deletes or raw revisions, the compaction process including compressing the objects identified as the candidates for compression and rewriting the compacted data to a new area of the storage media.

Conventional systems may use algorithms to compress data objects (or slices generated therefrom) at the time the data objects are ingested into a DSN (i.e., in-flight to the DSN storage media). However, compression of the data objects at the time they are ingested into the DSN may cause latency and negative impacts to the overall system performance of the DSN. On the other hand, storing all data as uncompressed data in the DSN may be an inefficient use of storage space on the storage media, particularly with respect to long-lived data objects.

Embodiments address problems with efficiently using storage space by compressing data in a DSN while minimizing latency and negative impacts to the overall system performance of the DSN. Accordingly, embodiments improve the functioning of a computer by providing methods and systems for compressing aging data in a DSN while compacting a storage medium. In particular, embodiments improve the functioning of a computer by providing a method and system that ingest data within a DSN; once the ingested data is at rest within storage media of the DSN, examine the ingested data to identify objects in the ingested data that have survived compaction more than a predetermined number of times as candidates for compression; and compact the ingested data to remove any gaps caused by object deletes or raw revisions, the compaction process including compressing the objects identified as the candidates for compression and rewriting the compacted data to a new area of the storage media. Additionally, implementations of the invention use techniques that are, by definition, rooted in computer technology (e.g., DSNs, DS processing units, DS storage units, and cloud computing).

In embodiments, once data is at rest on a storage medium (i.e., after ingestion), the data may be read and written many times as part of a data compaction process that is used to improve storage medium utilization by removing any holes. The data for a given area on the storage medium is read, all gaps caused by object deletes or new revisions are removed, and the compacted data is rewritten to a new area of the storage medium with 100% utilization since all of the data is relevant. In embodiments, the compaction process is used as an indication of object aging in the DSN. As objects get older, they keep surviving the compaction process. In embodiments, this knowledge is used to understand the number of times the object has survived compaction and determine, using a threshold determined based on system characteristics, when to compress the object. This compression will allow the object to reduce its footprint on the storage medium, producing an object that is more efficiently stored. In embodiments, since the compression is performed during the compaction process while the object is at rest (i.e., after ingestion) versus in-flight (i.e., at the time of ingestion), there is no impact to client performance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
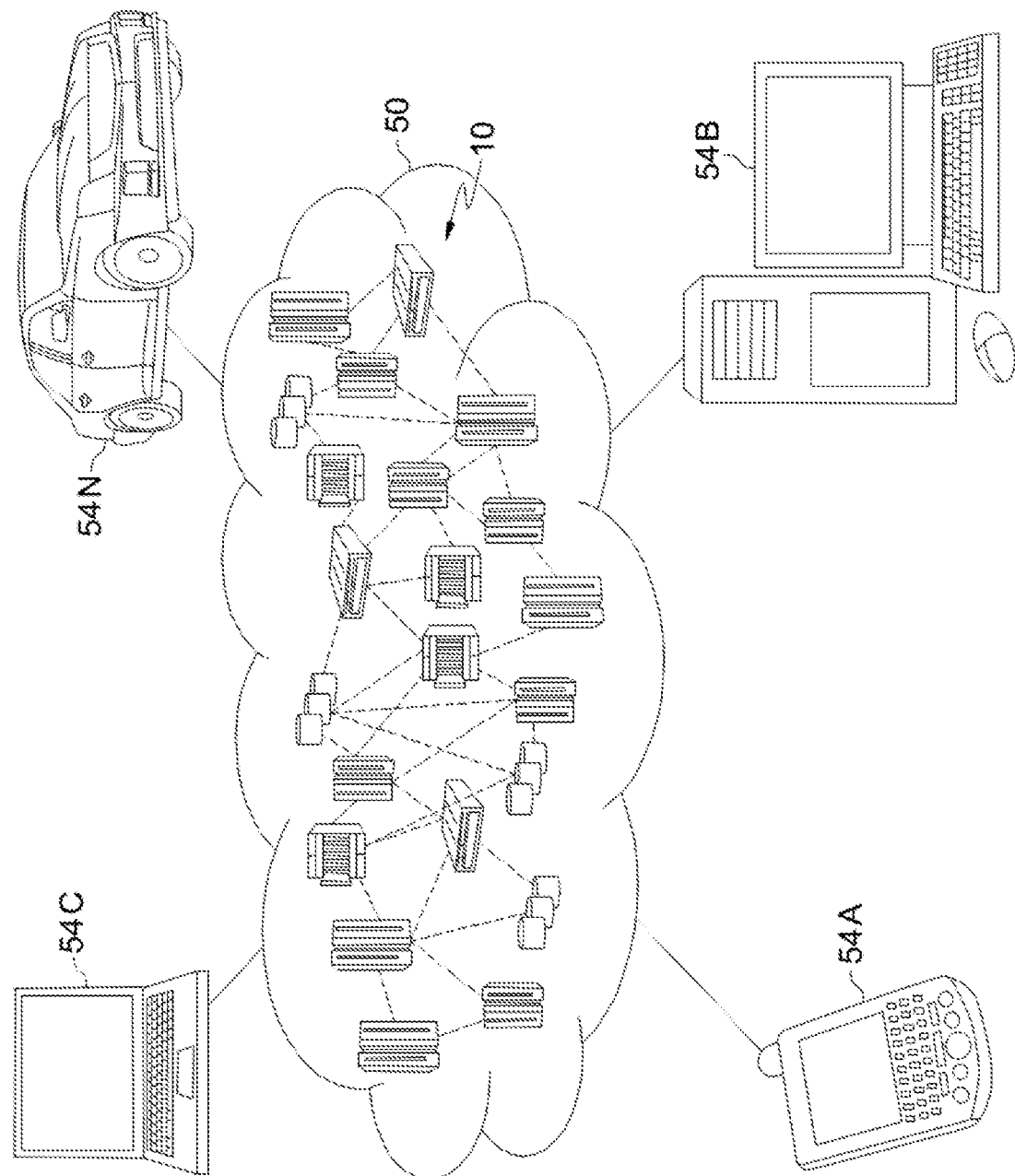
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
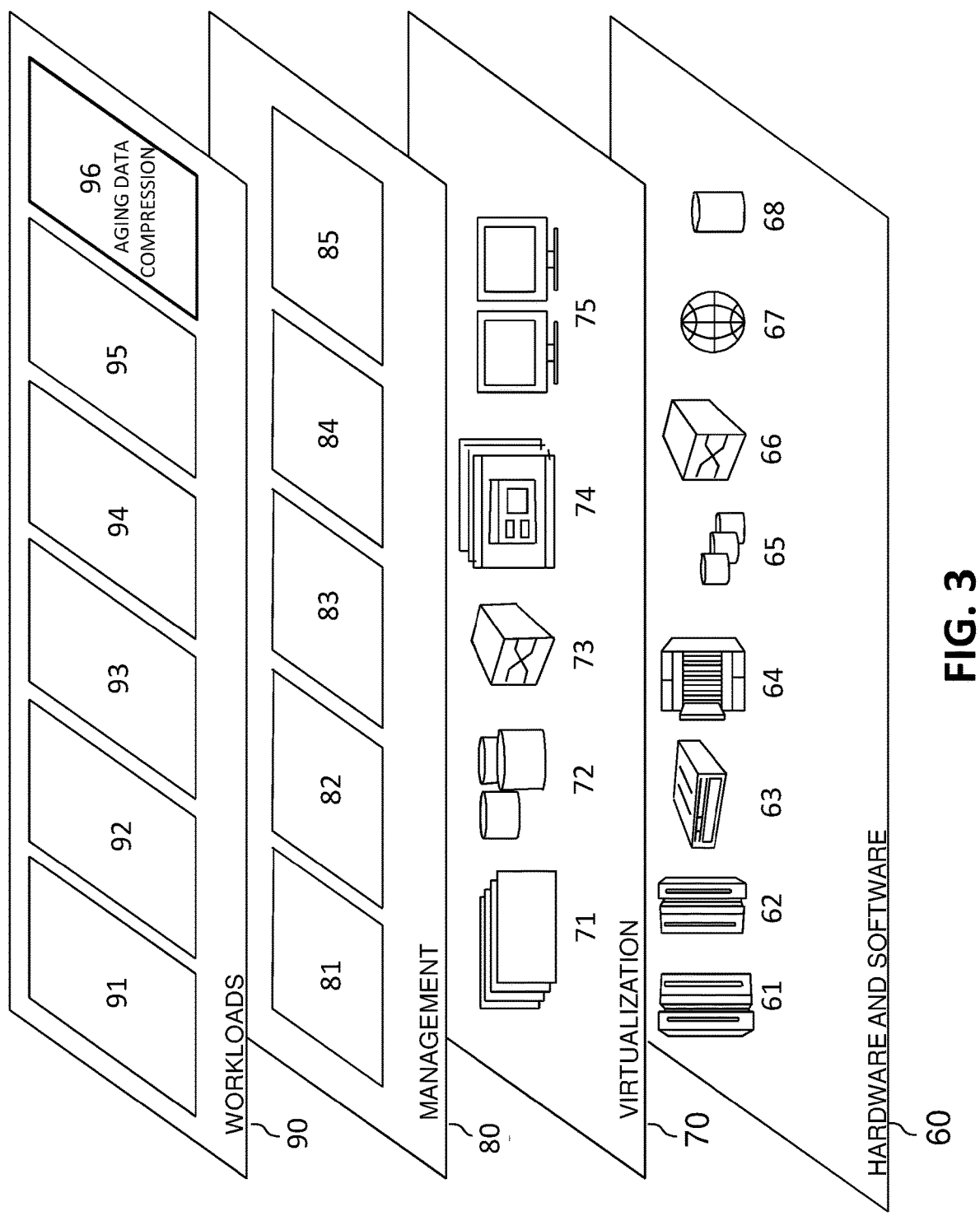
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and aging data compression 96.

Referring back to FIG. 1, the program/utility 40 may include one or more program modules 42 that generally carry out the functions and/or methodologies of embodiments of the invention as described herein (e.g., such as the functionality provided by aging data compression 96). Specifically, the program modules 42 may enable compressing aging data in a DSN while compacting a storage medium. Other functionalities of the program modules 42 are described further herein such that the program modules 42 are not limited to the functions described above. Moreover, it is noted that some of the program modules 42 can be implemented within the infrastructure shown in FIGS. 1-3. For example, the program modules 42 may be representative of a DS processing unit program module 420 and a DS storage unit program module 440 as shown in FIG. 4.

Figure 4:
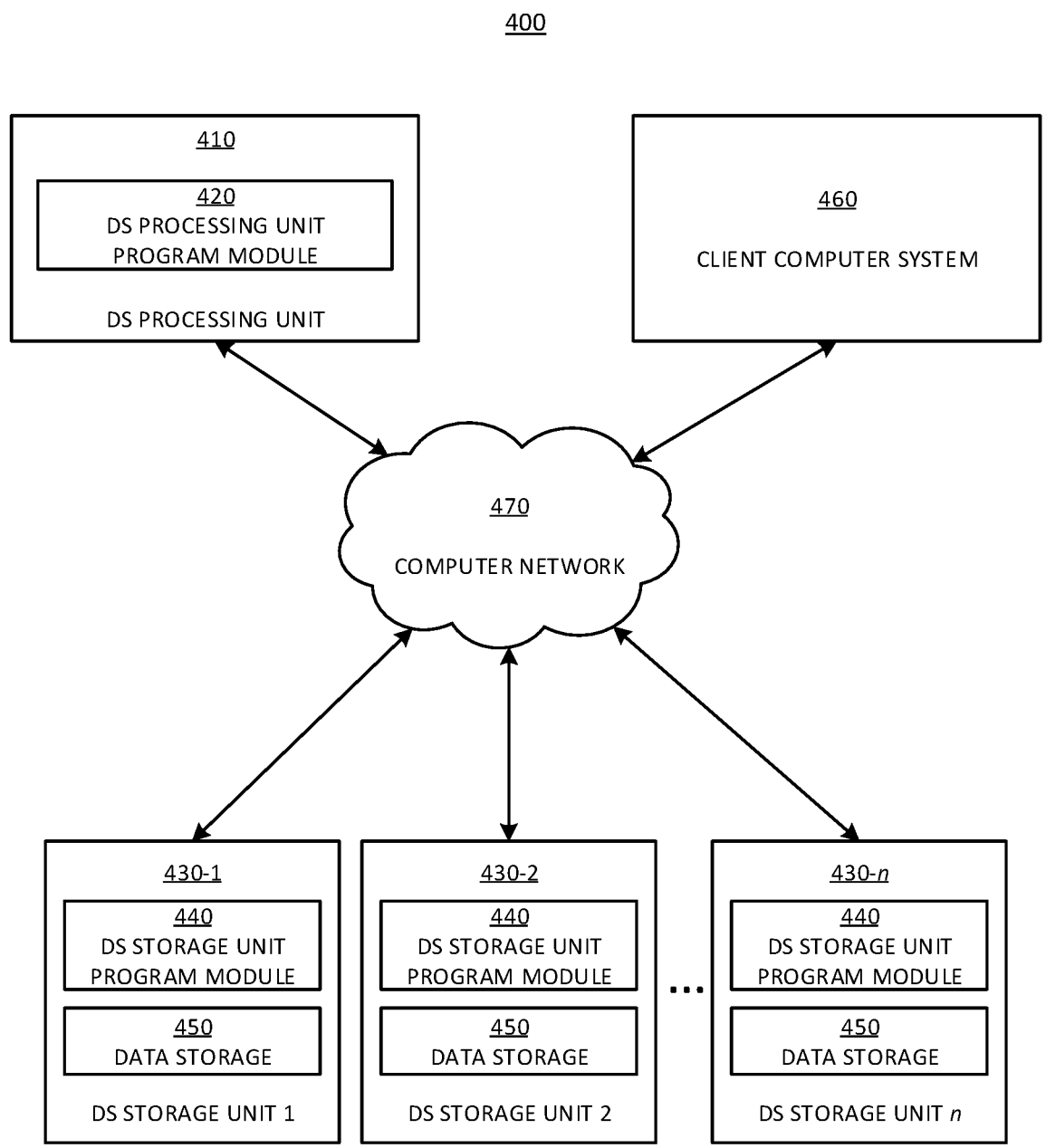
FIG. 4 depicts an illustrative environment in accordance with aspects of the invention.

FIG. 4 depicts an illustrative environment 400 in accordance with aspects of the invention. As shown, the environment 400 comprises at least one DS processing unit 410, a plurality of DS storage units 430-1, 430-2, . . . , 430-n, and a client computer system 460 which are in communication via a computer network 470. In embodiments, the computer network 470 is any suitable network including any combination of a LAN, WAN, or the Internet. In embodiments, the DS processing unit 410, the plurality of DS storage units 430-1, 430-2, . . . , 430-n, and the client computer system 460 are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the DS processing unit 410 in the environment 400 is situated in the cloud computing environment 50 and is one or more of the nodes 10 shown in FIG. 2. The DS processing unit 410 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the DS processing unit 410 includes a DS processing unit program module 420 which comprises one or more of the program modules 42 shown in FIG. 1. In embodiments, the DS processing unit program module 420 includes program instructions for storing data objects and retrieving data objects using the plurality of DS storage units 430-1, 430-2, . . . , 430-n, as discussed herein.

In particular, in embodiments, the DS processing unit program module 420 includes program instructions for receiving, from the client computer system 460, a request to store a data object in the DSN; generating a plurality of slices from the received data object; and sending, to one or more of the plurality of DS storage units 430-1, 430-2, . . . , 430-n, a request to store (write) one or more of the plurality of slices generated from the received data object. Additionally, in embodiments, the DS processing unit program module 420 includes program instructions for receiving, from the client computer system 460, a request to retrieve (read) a data object from the DSN; sending, to one or more of the plurality of DS storage units 430-1, 430-2, ..., 430-*n*, a request to retrieve (read) one or more of a plurality of slices corresponding to the requested data object; receiving, from the one or more of the plurality of DS storage units 430-1, 430-2, ..., 430-*n*, the requested slices; rebuilding the requested data object from the received slices; and returning the requested data object to the client computer system 460 as a response to the request for the data object. In embodiments, the program instructions included in the DS processing unit program module 420 of the DS processing unit 410 are executed by one or more hardware processors.

Still referring to FIG. 4, in embodiments, each of the plurality of DS storage units 430-1, 430-2, ..., 430-*n* in the environment 400 is situated in the cloud computing environment 50 and is one or more of the nodes 10 shown in FIG. 2. Each of the plurality of DS storage units 430-1, 430-2, ..., 430-*n* is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, each of the plurality of DS storage units 430-1, 430-2, ..., 430-*n* includes a DS storage unit program module 440 and a data storage 450. In an example, the DS storage unit program module 440 comprises one or more of the program modules 42 shown in FIG. 1. In embodiments, the DS storage unit program module 440 includes program instructions for storing (writing) slices of data objects and retrieving (reading) slices of data objects in the data storage 450 in accordance with instructions received from the DS processing unit program module 420 of the DS processing unit 410. In embodiments, the DS storage unit program module 440 also includes program instructions for compacting the data storage 450, including compressing aging data while compacting the data storage 450.

In embodiments, the data storage 450 receives and stores data in accordance with instructions received from the DS storage unit program module 440. The data storage 450 is one or more of any type or combination of types of data storage medium, data storage device, or system (e.g., storage device 65 of FIG. 3) and is located on (or is accessible to) the data storage unit 430-1, 430-2, ..., 430-*n*. For example, the data storage 450 may include one or more hard disk drives and one or more solid state drives. In other embodiments, the data storage 450 is one or more storage resources provided by a cloud computing provider on another cloud computing node(s) 10 or other location(s) associated with the cloud computing provider that is external to but accessible from the data storage unit 430-1, 430-2, ..., 430-*n*.

Still referring to FIG. 4, in embodiments, the client computer system 460 in the environment 400 includes one or more components of the computer system/server 12 (as shown in FIG. 1). In other embodiments, the client computer system 460 in the environment 400 is situated in the cloud computing environment 50 and is one or more of the nodes 10 shown in FIG. 2. In an example, the client computer system 460 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In other embodiments, the client computer system 460 is a desktop computer, a laptop computer, a mobile device such as a cellular phone, tablet, personal digital assistant (PDA), or any other computing device.

Figure 5:
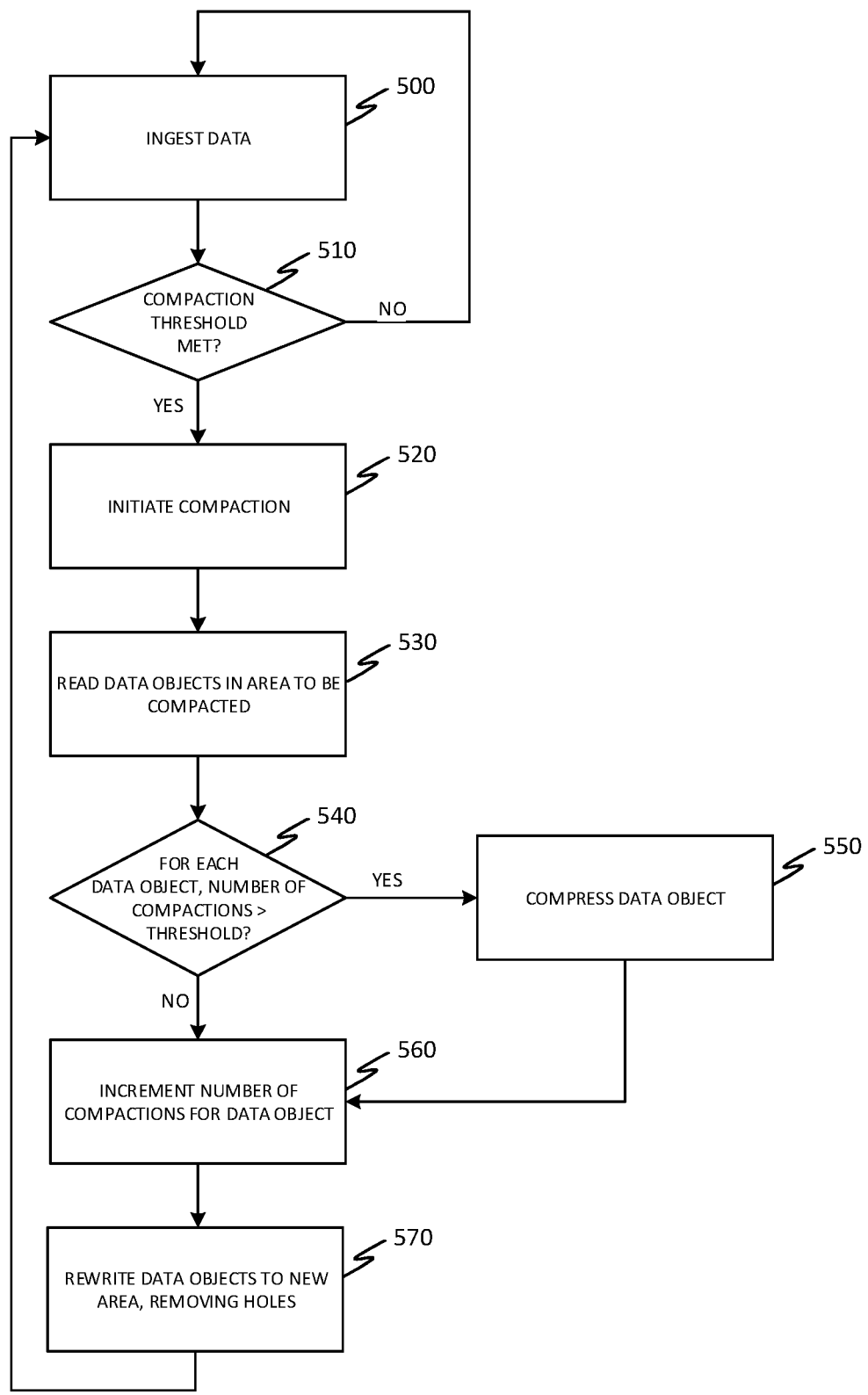
FIG. 5 depicts a flowchart of an exemplary method performed in accordance with aspects of the invention.

FIG. 5 depicts a flowchart of an exemplary method for compressing aging data in a DSN while compacting a storage medium. The method of FIG. 5 is performed by the DS storage unit program module 440 of the DS storage units 430-1, 430-2, ..., 430-*n* in accordance with aspects of the invention. In other embodiments, the DS processing unit program module 420 of the DS processing unit 410 performs some or all of the steps of the method of FIG. 5, and/or the DS storage unit program module 440 of the DS storage units 430-1, 430-2, ..., 430-*n* performs some or all of the steps of the method of FIG. 5 in response to instructions received from the DS processing unit program module 420 of the DS processing unit 410. The steps of the method are performed in the environment of FIG. 4 and are described with reference to the elements shown in FIG. 4.

At step 500, the DS processing unit 410 ingests data. In embodiments, the DS processing unit program module 420 of the DS processing unit 410 receives a request, from the client computer system 460, to store (write) a data object in the DSN. In response to receiving the request to store the data object, the DS processing unit program module 420 generates a plurality of slices from the received data object and sends, to one or more of the plurality of DS storage units 430-1, 430-2, ..., 430-*n*, requests to store (write) one or more of the plurality of slices generated from the received data object. The DS storage unit program module 440 of each of the DS storage units 430-1, 430-2, ..., 430-*n* receives the request to store (write) one or more of the plurality of slices generated from the received data object from the DS processing unit program module 420 of the DS processing unit 410 and stores (writes) the one or more of the plurality of slices in the data storage 450 of the DS storage unit 430-1, 430-2, ..., 430-*n*.

Still referring to FIG. 5, at step 510, a DS storage unit 430-1, 430-2, ..., 430-*n* determines whether or not a compaction threshold has been met. In embodiments, the DS storage unit program module 440 of the DS storage unit 430-1, 430-2, ..., 430-*n* determines whether or not the compaction threshold has been met with respect to a particular area in the data storage 450. In particular, holes (gaps) may be created in data stored in the data storage 450 of the DS storage unit 430-1, 430-2, ..., 430-*n* as data objects (e.g., objects ingested at step 500) and slices associated therewith are deleted (or marked as deleted) and/or particular revisions (versions) of stored data objects and slices associated therewith are removed (or marked as deleted) (e.g., in response to instructions received from the client computer system 460).

Still referring to step 510, in embodiments, the compaction threshold may be a predetermined threshold or a dynamically determined threshold based on a number and/or size of holes in the particular area of the data storage 450, utilization (fullness) of the data storage 450, and/or any other metrics, automatically determined parameters, or user-defined parameters. In an example, as the data storage 450 becomes more fully utilized, the compaction threshold may be lowered so that compaction is performed more frequently. In another example, the compaction threshold may be set such that compaction is triggered when a predetermined amount of space on the data storage 450 will be reclaimed. In another example, the compaction threshold may be dynamically determined based upon a system load of the DS storage unit 430-1, 430-2, ..., 430-*n* (i.e., if the system load is comparatively lower, compaction may be performed more frequently than if the system load is comparatively higher).

Still referring to step 510, if the DS storage unit program module 440 of the DS storage unit 430-1, 430-2, . . . , 430-*n* determines that the compaction threshold has been met, then the flow proceeds to step 520. On the other hand, if the DS storage unit program module 440 of the DS storage unit 430-1, 430-2, . . . , 430-*n* determines that the compaction threshold has not been met, then the flow returns to step 500.

Still referring to FIG. 5, at step 520, the DS storage unit 430-1, 430-2, . . . , 430-*n* initiates compaction. In embodiments, the DS storage unit program module 440 of the DS storage unit 430-1, 430-2, . . . , 430-*n* initiates a compaction (garbage collection) process to remove the holes in the particular area in the data storage 450 that was determined to meet the compaction threshold at step 510.

Still referring to FIG. 5, at step 530, the DS storage unit 430-1, 430-2, . . . , 430-*n* reads data objects in the area to be compacted. In embodiments, the DS storage unit program module 440 of the DS storage unit 430-1, 430-2, . . . , 430-*n* reads all of the slices of data objects or the slices of versions of data objects in the area of the data storage 450 to be compacted that are neither deleted nor marked as deleted (e.g., as indicated in metadata for the data objects, stored in the DS storage unit 430-1, 430-2, . . . , 430-*n* and/or the DS processing unit 410). During the compaction process, garbage collection is performed, which is a process that avoids reading the slices of data objects (or the slices of versions of data objects) that are deleted (or marked as deleted) in step 530 and avoids rewriting these slices of data objects (or slices of versions of data objects) in step 570, described below.

Still referring to FIG. 5, at step 540, the DS storage unit 430-1, 430-2, . . . , 430-*n* determines, for each data object, whether or not a number of compactions exceeds a threshold. In embodiments, the DS storage unit program module 440 of the DS storage unit 430-1, 430-2, . . . , 430-*n* determines, for each slice read at step 530, whether or not the number of compactions of the slice exceeds a predetermined threshold. In embodiments, a compaction counter is stored in the data storage 450, in another area of the DS storage unit 430-1, 430-2, . . . , 430-*n*, or in the DS processing unit 410. The compaction counter tracks a number of times a slice (or data object) has been compacted. In embodiments, the compaction counter for older slices in the data storage 450 may indicate a higher number of compactions as compared to newer slices. As slices continue to age in the data storage 450, the compaction counter will typically continue to increment, reflecting an increasing number of compactions over time (due to repeated triggering of the compaction threshold at step 510). In embodiments, the predetermined threshold is 2 compactions. In other embodiments, the predetermined threshold is 3 compactions. In still other embodiments, different thresholds are used. The threshold may be any number and may be automatically determined or user-defined. In embodiments, in a case where data is frequently accessed, a comparatively larger number of compactions may be used as the threshold, as compared to a case where data is accessed less frequently.

Still referring to step 540, if the DS storage unit program module 440 of the DS storage unit 430-1, 430-2, . . . , 430-*n* determines that the number of compactions exceeds the threshold, then the flow proceeds to step 550. On the other hand, if the DS storage unit program module 440 of the DS storage unit 430-1, 430-2, . . . , 430-*n* determines that the number of compactions does not exceed the threshold, then the flow proceeds to step 560.

Still referring to FIG. 5, at step 550, the DS storage unit 430-1, 430-2, . . . , 430-*n* compresses the data object. In embodiments, the DS storage unit program module 440 of the DS storage unit 430-1, 430-2, . . . , 430-*n* compresses the slice read at step 530 for which the number of compactions was determined to exceed the threshold at step 540. The DS storage unit program module 440 may be configured to use any compression algorithm, compression program module, or external compression program or service (e.g., a web service) to compress the slice. In embodiments, the slice that is compressed by the DS storage unit program module 440 is unencrypted data. In other embodiments, the slice that is compressed by the DS storage unit program module 440 is encrypted data. In embodiments, the DS storage unit program module 440 compresses the slice using a background process while the data is at rest (i.e., after ingestion at step 500), thereby avoiding potential negative impacts to the performance of the client computer system 460 and the overall system performance of the DSN that may occur when compressing at the time of ingestion.

Still referring to FIG. 5, at step 560, the DS storage unit 430-1, 430-2, . . . , 430-*n* increments the number of compactions for the data object. In embodiments, the DS storage unit program module 440 of the DS storage unit 430-1, 430-2, . . . , 430-*n* increments the compaction counter for the slice by 1 to reflect the compaction process that is being performed (i.e., steps 520 to 570). In embodiments, the compaction counter is stored in the data storage 450, in another area of the DS storage unit 430-1, 430-2, . . . , 430-*n*, or in the DS processing unit 410. The number of times an object or slice has survived the compaction process is an indication of age of the object or slice. As objects or slices age, they keep surviving the compaction process.

Still referring to FIG. 5, at step 570, the DS storage unit 430-1, 430-2, . . . , 430-*n* rewrites the data objects to a new area, removing holes. In embodiments, the DS storage unit program module 440 of the DS storage unit 430-1, 430-2, . . . , 430-*n* compactly rewrites the slices read at step 530, zero or more of which having been compressed at step 550 based on the determination at step 540, to a new area on the data storage 450. By compactly rewriting the slices read at step 530 to the new area on the data storage 450, the DS storage unit program module 440 eliminates holes and writes the data to the new area on the data storage 450 with 100% utilization. Additionally, in embodiments, as long-lived slices having a number of compactions exceeding the compaction threshold (determined at step 540) are compressed by the DS storage unit program module 440 at step 550 before being rewritten to the new area on the data storage 450 by the DS storage unit program module 440, the footprint of each of the compressed long-lived slices on the data storage 450 is reduced (i.e., the storage space requirement is decreased) and the data storage 450 is more efficiently utilized, as compared to a case where none of the slices are compressed, while minimizing the computational impact on the DS storage unit 430-1, 430-2, . . . , 430-*n* by only compressing the long-lived slices using a background process. The flow then returns to step 500.

Still referring to step 570, in another embodiment, in the rewriting the data objects to a new area, the DS storage unit program module 440 of the DS storage unit 430-1, 430-2, . . . , 430-*n* rewrites the data objects read at step 530 and compressed at step 550 to a new area on a different data storage 450 that is a slower media type (e.g., a hard disk drive instead of a solid state drive) as compared to that on which the data objects read at step 530 but not compressed at step 550 are written. In an example, compaction is performed with respect to slices stored in a first storage area on a first storage medium. For slices read at step 530 and compressed at step 550 based on the determination at step 540, the compressed slices are stored in a second storage area on a second storage medium. Additionally, in this example, for slices read at step 530 and not compressed at step 550 based on the determination at step 540, the uncompressed slices are stored in a third storage area on a third storage medium, the first storage medium and the third storage medium (e.g., solid state drives) being faster than the second storage medium (e.g., a hard disk drive). In this way, long-lived slices (e.g., those compressed at step 550) which may be infrequently read are stored on a comparatively slower storage medium, while shorter-lived slices which may be more frequently read are stored on a comparatively faster storage medium.

In embodiments, a system and method are provided for compressing aging data during a compaction process within a DSN, comprising the steps of: ingesting data within the DSN; once the ingested data is at rest within a storage media of the DSN, examining the ingested data to determine if an object has survived compaction more than a predetermined number of times; if an object has survived compaction more than a predetermined number of times, identifying the object as a candidate for compaction; compacting the ingested data to remove any gaps caused by object deletes or raw revisions including the candidate objects for compaction; and rewriting the compacted data to a new area of the storage media.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   ingesting, by a computing device, a plurality of data objects into a dispersed storage network (DSN);
   determining, by the computing device, that a compaction threshold is met for a first storage medium in the DSN; and
   compacting, by the computing device, the first storage medium, the compaction comprising, for each of the plurality of data objects:
   determining, by the computing device, a number of times the data object has been compacted;
   in response to the number of times the data object has been compacted exceeding a predetermined threshold, the computing device compressing the data object and rewriting the compressed data object to a second storage medium in the DSN; and
   in response to the number of times the data object has been compacted not exceeding the predetermined threshold, the computing device rewriting the data object to a third storage medium in the DSN without compressing the data object,
   wherein the second storage medium is a slower media type than the first storage medium and the third storage medium.

2. The method according to claim 1, wherein the ingesting the plurality of data objects comprises for each of the plurality of data objects: generating a plurality of data slices from the data object; and sending to a plurality of storage units a request to store one or more of the plurality of generated slices; and
   further comprising receiving a request to read one of the plurality of data objects;
   sending to the plurality of storage units a request to retrieve a plurality of slices corresponding to the one of the plurality of data objects;
   receiving the plurality of slices corresponding to the one of the plurality of data objects;
   rebuilding the one of the plurality of data objects from the received plurality of slices; and
   returning the one of the plurality of data objects to a client computer system that made the request to read the one of the plurality of data objects.

3. The method according to claim 2, wherein the plurality of data objects is written uncompressed to the first area on the first storage medium.

4. The method according to claim 2, wherein the compaction threshold is based on an amount of space that will be reclaimed by compaction.

5. The method according to claim 1, wherein the compaction threshold is dynamically based on a system load of a storage unit containing the first storage medium, such that compaction is performed more frequently when the system load is lower and less frequently when the system load is higher.

6. The method according to claim 1, wherein the compaction threshold is dynamically based on utilization of the first storage medium, such that the compaction threshold decreases as the utilization of the first storage medium increases.

7. The method according to claim 1, wherein the plurality of data objects is unencrypted.

8. The method according to claim 1, wherein the plurality of data objects is encrypted.

9. A computer program product comprising:
one or more computer readable storage media, and program instructions collectively stored on the one or more computer readable storage media, the program instructions comprising:
program instructions to ingest a plurality of data objects into a dispersed storage network (DSN);
program instructions to, for each of the plurality of ingested data objects, generate a plurality of slices from the data object and store one or more of the plurality of slices in a first storage area of a first storage medium in the DSN;
program instructions to determine that a compaction threshold is met for the first storage area; and
program instructions to perform compaction by, for each of the slices stored in the first storage area:
  determining a number of times the slice has been compacted;
  in response to the number of times the slice has been compacted exceeding a predetermined threshold, compressing the slice and rewriting the compressed slice to a second storage area of a second storage medium in the DSN; and
  in response to the number of times the slice has been compacted not exceeding the predetermined threshold, rewriting the slice to a third storage area of a third storage medium in the DSN without compressing the data object,
  wherein the second storage medium is a slower media type than the first storage medium and the third storage medium.

10. The computer program product according to claim 9, wherein the second storage area of the second storage medium is slower than the first storage area of the first storage medium and the third storage area of the third storage medium.

11. The computer program product according to claim 9, wherein the slices stored in the first storage area are uncompressed.

12. The computer program product according to claim 9, wherein the compaction threshold is based on a number and size of holes in the first storage area.

13. The computer program product according to claim 9, wherein the compaction threshold is based on utilization of the first storage medium.

14. The computer program product according to claim 9, wherein the compaction threshold is based on an amount of space that will be reclaimed on the first storage medium by compaction.

15. The computer program product according to claim 9, wherein the plurality of data objects is unencrypted.

16. The computer program product according to claim 9, wherein the plurality of data objects is encrypted.

17. A system comprising:
a processor, a computer readable memory, one or more computer readable storage media, and program instructions collectively stored on the one or more computer readable storage media, the program instructions executable to:
ingest a plurality of data objects into a dispersed storage network (DSN);
determine that a compaction threshold is met for a first storage medium in the DSN; and
compact the first storage medium, the compaction comprising, for each of the plurality of data objects:
  determining a number of times the data object has been compacted;
  reading a plurality of slices of the data object in the first storage medium to be compacted that are neither deleted nor marked as deleted;
  in response to the number of times the data object has been compacted exceeding a predetermined threshold, compressing the data object and rewriting the compressed data object on a second storage medium, wherein compressing the data object includes compressing at least one of the slices of the data object; and
  in response to the number of times the data object has been compacted not exceeding the predetermined threshold, rewriting the data object on a third storage medium without compressing the data object,
  wherein the second storage medium is a slower media type than the first storage medium and the third storage medium, the second storage medium being a hard disk drive and the third storage medium being a solid state drive.

18. The system according to claim 17, wherein the ingesting the plurality of data objects comprises writing each of the plurality of data objects to a first area on the first storage medium.

19. The system according to claim 18, wherein the plurality of data objects is written uncompressed to the first area on the first storage medium.

20. The system according to claim 18, wherein the compaction threshold is based on a number and size of holes in the first area on the first storage medium.

* * * * *